United States Patent
Kim et al.

(10) Patent No.: US 11,394,089 B2
(45) Date of Patent: Jul. 19, 2022

(54) ELECTRODE ASSEMBLY AND METHOD FOR MANUFACTURING THE SAME

(71) Applicant: LG CHEM, LTD., Seoul (KR)

(72) Inventors: Dae Soo Kim, Daejeon (KR); Young Deok Kim, Daejeon (KR); Dong Kyu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 440 days.

(21) Appl. No.: 16/347,983

(22) PCT Filed: Feb. 28, 2018

(86) PCT No.: PCT/KR2018/002507
§ 371 (c)(1),
(2) Date: May 7, 2019

(87) PCT Pub. No.: WO2018/230814
PCT Pub. Date: Dec. 20, 2018

(65) Prior Publication Data
US 2019/0288267 A1    Sep. 19, 2019

(30) Foreign Application Priority Data
Jun. 13, 2017   (KR) .......................... 10-2017-0074036

(51) Int. Cl.
*H01M 10/0585* (2010.01)
*H01M 10/04* (2006.01)
(Continued)

(52) U.S. Cl.
CPC .......... *H01M 50/531* (2021.01); *H01M 4/02* (2013.01); *H01M 4/04* (2013.01); *H01M 4/0433* (2013.01);
(Continued)

(58) Field of Classification Search
CPC ........ H01M 50/531; H01M 4/02; H01M 4/04; H01M 4/0433; H01M 4/13; H01M 4/139;
(Continued)

(56) References Cited

U.S. PATENT DOCUMENTS

| 4,810,599 A | 3/1989 | Kondo et al. |
| 9,236,594 B2 | 1/2016 | Iwaya et al. |

(Continued)

FOREIGN PATENT DOCUMENTS

| CA | 2 709 111 A1 | 7/2009 |
| CN | 101663788 A | 3/2010 |

(Continued)

OTHER PUBLICATIONS

CN202737037MT (Year: 2013).*
(Continued)

*Primary Examiner* — Alexander Usyatinsky
(74) *Attorney, Agent, or Firm* — Birch, Stewart, Kolasch & Birch, LLP

(57) ABSTRACT

An electrode assembly, in which a plurality of unit electrodes and a plurality of separators are alternately laminated, is provided. Each of the unit electrodes is provided by connecting a plurality of electrodes, each electrode being entirely made of a solid electrode mixture, to each other, and the solid electrode mixture including a mixture of an electrode active material with at least one or more of a conductive material and a binder.

11 Claims, 8 Drawing Sheets

(51) Int. Cl.
  *H01M 50/531* (2021.01)
  *H01M 4/04* (2006.01)
  *H01M 4/139* (2010.01)
  *H01M 4/62* (2006.01)
  *H01M 4/02* (2006.01)
  *H01M 10/058* (2010.01)
  *H01M 4/13* (2010.01)

(52) U.S. Cl.
  CPC ............ *H01M 4/13* (2013.01); *H01M 4/139* (2013.01); *H01M 4/62* (2013.01); *H01M 4/621* (2013.01); *H01M 10/04* (2013.01); *H01M 10/0472* (2013.01); *H01M 10/058* (2013.01); *H01M 10/0585* (2013.01)

(58) Field of Classification Search
  CPC ........ H01M 4/62; H01M 4/621; H01M 10/04; H01M 10/0472; H01M 10/058; H01M 10/0585
  See application file for complete search history.

(56) References Cited

U.S. PATENT DOCUMENTS

| | | |
|---|---|---|
| 10,340,528 B2 | 7/2019 | Roumi et al. |
| 2003/0059675 A1* | 3/2003 | Sasaki ............... H01M 10/0436 429/233 |
| 2007/0059603 A1 | 3/2007 | Sasaki et al. |
| 2010/0075219 A1* | 3/2010 | Iwaya .................. H01M 4/624 429/158 |
| 2010/0291442 A1* | 11/2010 | Wang .................... H01M 4/667 429/231.95 |
| 2013/0029212 A1 | 1/2013 | Hong |
| 2015/0372291 A1 | 12/2015 | Ryu et al. |
| 2016/0204428 A1* | 7/2016 | Sugawara ............... H01M 4/13 429/217 |
| 2016/0268580 A1* | 9/2016 | Yi ....................... H01M 50/502 |
| 2016/0359202 A1 | 12/2016 | Jeon et al. |
| 2017/0025702 A1 | 1/2017 | Jung et al. |
| 2017/0309918 A1 | 10/2017 | Roumi et al. |
| 2019/0067752 A1 | 2/2019 | Jeon et al. |
| 2019/0229343 A1 | 7/2019 | Roumi et al. |

FOREIGN PATENT DOCUMENTS

| | | | |
|---|---|---|---|
| CN | 202737037 | * | 2/2013 |
| CN | 202737037 U | | 2/2013 |
| JP | 2000-138142 A | | 5/2000 |
| JP | 2003-100282 A | | 4/2003 |
| JP | 3403678 B2 | | 5/2003 |
| JP | 2005-93306 A | | 4/2005 |
| KR | 10-1224172 B1 | | 1/2013 |
| KR | 10-2013-0014371 A | | 2/2013 |
| KR | 10-2016-0000235 A | | 1/2016 |
| KR | 10-2016-0014370 A | | 2/2016 |
| KR | 10-2016-0027364 A | | 3/2016 |
| KR | 10-2016-0040087 A | | 4/2016 |
| KR | 10-2016-0059688 A | | 5/2016 |
| KR | 10-2016-0086795 A | | 7/2016 |
| KR | 10-2016-0142654 A | | 12/2016 |
| KR | 10-2017-0012962 A | | 2/2017 |
| WO | WO 2007/059269 A2 | | 5/2007 |
| WO | WO 2017/096258 A1 | | 6/2017 |
| WO | WO 2017/096258 | * | 8/2017 |

OTHER PUBLICATIONS

18818316, Decision_to_grant_a_European_patent, Nov. 18, 2021 (Year: 2021).*
The decision of SIPO to grant a Paten for Application No. CN.201810381206 (Year: 2020).*
International Search Report for PCT/KR2018/002507 dated Jun. 4, 2018.
Park, G.G., et al., "Flexible and wrinkle-free electrode fabricated with polyurethane binder for lithium-ion batteries," RSC Adv., 2017, vol. 7, pp. 16244-16252.
Extended European Search Report dated May 12, 2020 for Application No. 18818316.4.

* cited by examiner

ELECTRODE ASSEMBLY AND METHOD FOR MANUFACTURING THE SAME

CROSS-REFERENCE TO RELATED APPLICATION

The present application claims the benefit of the priority of Korean Patent Application No. 10-2017-0074036, filed on Jun. 13, 2017, which is hereby incorporated by reference in its entirety.

TECHNICAL FIELD

The present invention relates to an electrode assembly and a method for manufacturing the same, and more particularly, an electrode assembly comprising a unit electrode having a novel structure and a method for manufacturing the same.

BACKGROUND ART

In general, secondary batteries refer to chargeable and dischargeable batteries, unlike primary batteries that are not chargeable. The secondary batteries are being widely used in the fields of small and advanced electronic devices such as mobile phones, PDAs, and notebook computers.

Such a secondary battery comprises an electrode assembly, an electrode lead coupled to the electrode assembly, and a pouch accommodating the electrode assembly in a state in which a front end of the electrode lead is withdrawn to the outside. The electrode assembly has a structure in which a plurality of electrodes and a plurality of separators are alternately laminated.

Each of the electrodes comprises a collector and an electrode active material applied to the collector. That is, the electrode is manufactured by applying the liquid electrode active material to a surface of the collector at a predetermined thickness.

However, the electrode has to comprise the collector. Thus, there is a problem that it is difficult to newly design an electrode having a novel structure.

DISCLOSURE OF THE INVENTION

Technical Problem

The present invention has been made to solve the above-mentioned problem, and an object of the present invention is to provide an electrode assembly capable of realizing a unit electrode having a novel structure by using an electrode made of a solid electrode mixture without a collector and a method for manufacturing the same.

Technical Solution

To achieve the above-described object, an electrode assembly according to an embodiment of the present invention comprises a plurality of unit electrodes and a plurality of separators, which are alternately laminated, wherein each of the unit electrodes is provided by connecting a plurality of electrodes, each electrode being entirely made of a solid electrode mixture, to each other, and wherein the solid electrode mixture comprises a mixture of an electrode active material with at least one or more of a conductive material and a binder.

At least two electrodes of the plurality of electrodes may be connected to each other side-by-side. In addition, at least a third electrode may be stacked on one of the at least two electrodes. At least two electrodes of the plurality of electrodes may be connected to each other by stacking one of the at least two electrodes on another of the at least two electrodes.

The plurality of electrodes may provide an integrated unit electrode by adhesion of an outer surface of each electrode to an outer surface of an adjacent electrode.

The plurality of electrodes may provide an integrated unit electrode having conductivity by conductivity of each of the electrodes.

The electrode assembly may further comprise an electrode tab attached to the unit electrode, wherein the electrode tab may be attached to at least one or more of a surface or an edge of the unit electrode.

The electrode tab may be provided as an electrode wire having flexibility and conductivity.

An end of the electrode tab may be attached to the unit electrode by applying heat and a pressure in a state of overlaying the unit electrode.

A method for manufacturing an electrode assembly according to an embodiment of the present invention comprises: an electrode manufacturing step comprising pressing a solid electrode mixture to manufacture a plurality of electrodes; a unit electrode manufacturing step comprising connecting the plurality of electrodes manufactured in the electrode manufacturing step to each other to manufacture a unit electrode; and an electrode assembly manufacturing step comprising alternately laminating the plurality of unit electrodes manufactured in the unit electrode manufacturing step and one or more separators to manufacture an electrode assembly, wherein the solid electrode mixture is formed mixing an electrode active material with at least one or more of a conductive material and a binder.

In the unit electrode manufacturing step, at least two electrodes of the plurality of electrodes may be connected to each other side-by-side to manufacture the unit electrode. In addition, in the unit electrode manufacturing step, at least a third electrode may be stacked on one of the at least two electrodes. Also, in the unit electrode manufacturing step, at least two electrodes of the plurality of electrodes are connected to each other by stacking one of the at least two electrodes on another of the at least two electrodes.

The method may further comprise an electrode tab attaching step comprising attaching an electrode tab to the unit electrode between the unit electrode manufacturing step and the electrode assembly manufacturing step.

The electrode tab may be formed by using an electrode wire having flexibility and conductivity.

The unit electrode manufacturing step may further comprise a process of applying heat and a pressure to the unit electrode in which the plurality of electrodes are connected to each other to increase adhesion of the plurality of electrodes.

Advantageous Effects

The present invention according to the foregoing embodiments has effects as follows.

First: the electrode assembly of the present invention may have the feature in which the plurality of electrodes, each of which is made of the solid electrode mixture, are connected to each other to form the unit electrode. Therefore, the unit electrode may be realized without the collector, and particularly, the unit electrode having the novel structure may be newly designed according to the direction in which the plurality of electrodes are connected to each other.

Second: the electrode assembly of the present invention may have the feature in which the conductive material and the binder are further mixed with the electrode mixture to form the electrode. Therefore, the unit electrode having the conductivity and the adhesion may be realized.

Third: the electrode assembly of the present invention may have the feature in which the electrode tab is attached to the unit electrode, and the electrode tab is attached to all of the entire surface and edge surface of the unit electrode. Therefore, the unit electrode may be more newly designed.

Fourth: the electrode assembly of the present invention may have the feature in which the electrode tab is formed by using the electrode wire having the flexibility and conductivity. Therefore, the electrode tab may be freely adjusted in position.

MODE FOR CARRYING OUT THE INVENTION

Figure 1:
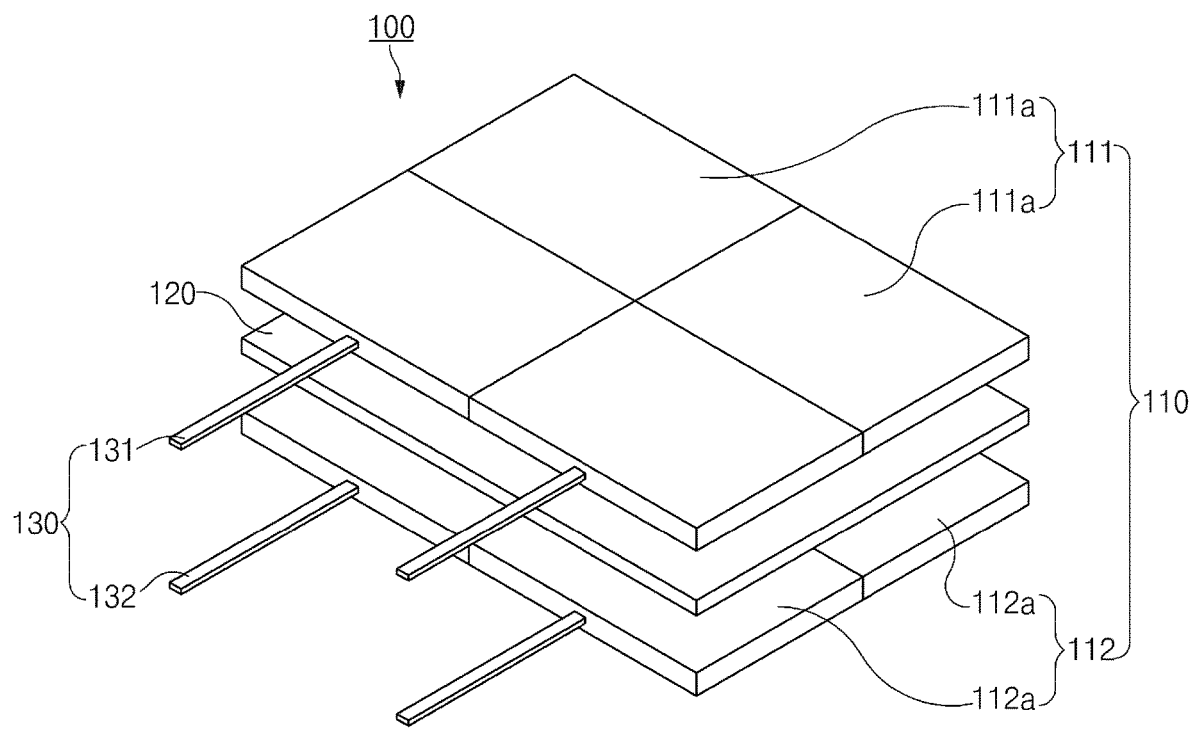
FIG. 1 is a perspective view of an electrode assembly according to an embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

An electrode assembly according to an embodiment of the present invention has a structure in which a plurality of unit electrodes and a plurality of separators are alternately laminated. The unit electrode may be formed by a plurality of electrodes, each of which is entirely made of a solid electrode mixture, to each other without a collector. Thus, the unit electrode having a novel structure may be newly designed according to a direction in which the plurality of electrodes are connected to each other.

Figure 2:
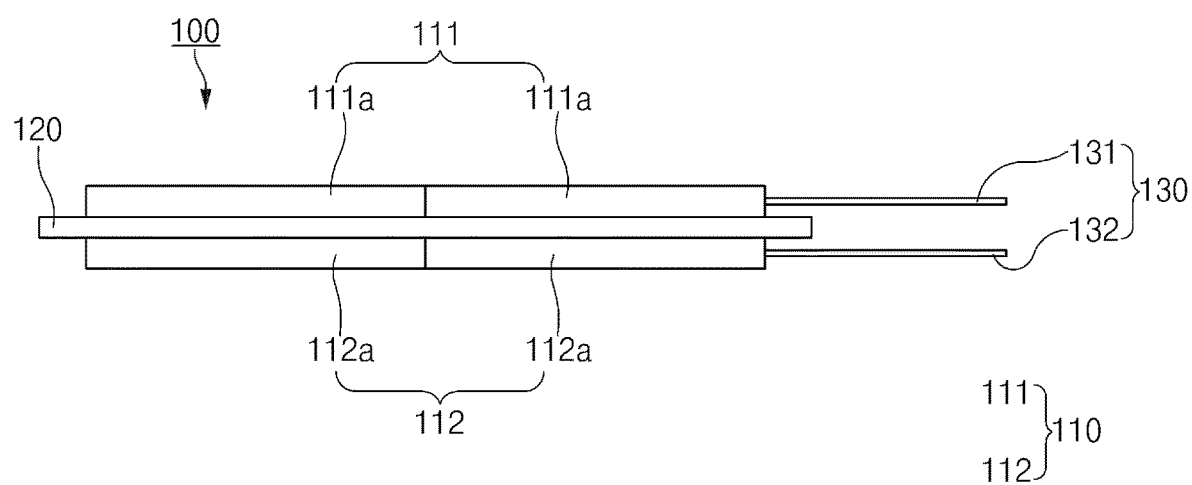
FIG. 2 is a side view of the electrode assembly according to an embodiment of the present invention.

For example, as illustrated in FIGS. 1 and 2, an electrode assembly 100 according to an embodiment has a structure in which a plurality of unit electrodes 110 and a plurality of separators 120 are alternately laminated. Here, each of the unit electrodes 110 is formed by connecting a plurality of electrodes, each of which is entirely made of a solid electrode mixture, to each other.

That is, the plurality of unit electrodes 110 comprise a first unit electrode 111 and a second unit electrode 112, which have polarities different from each other. The first unit electrode 111 is formed by a plurality of first electrodes 111a, each of which is entirely made of a solid first electrode mixture, to each other, and the second unit electrode 112 is formed by a plurality of second electrodes 112a, each of which is entirely made of a solid second electrode mixture, to each other.

Here, since the first or second electrode 111a or 112b does not comprise a collector, a plurality of first or second electrodes 111a or 112b may be connected to each other side-by-side or in a thickness direction of the electrode. Thus, the first or second unit electrode 111 or 112 having a novel structure may be newly designed, and a newly designed electrode assembly 100 comprising the first and second unit electrodes 111 and 112, which are newly designed, and the separator 120 may be realized.

An embodiment of the electrode assembly 100 that is newly designed as described above will be described as follows.

Figure 3:
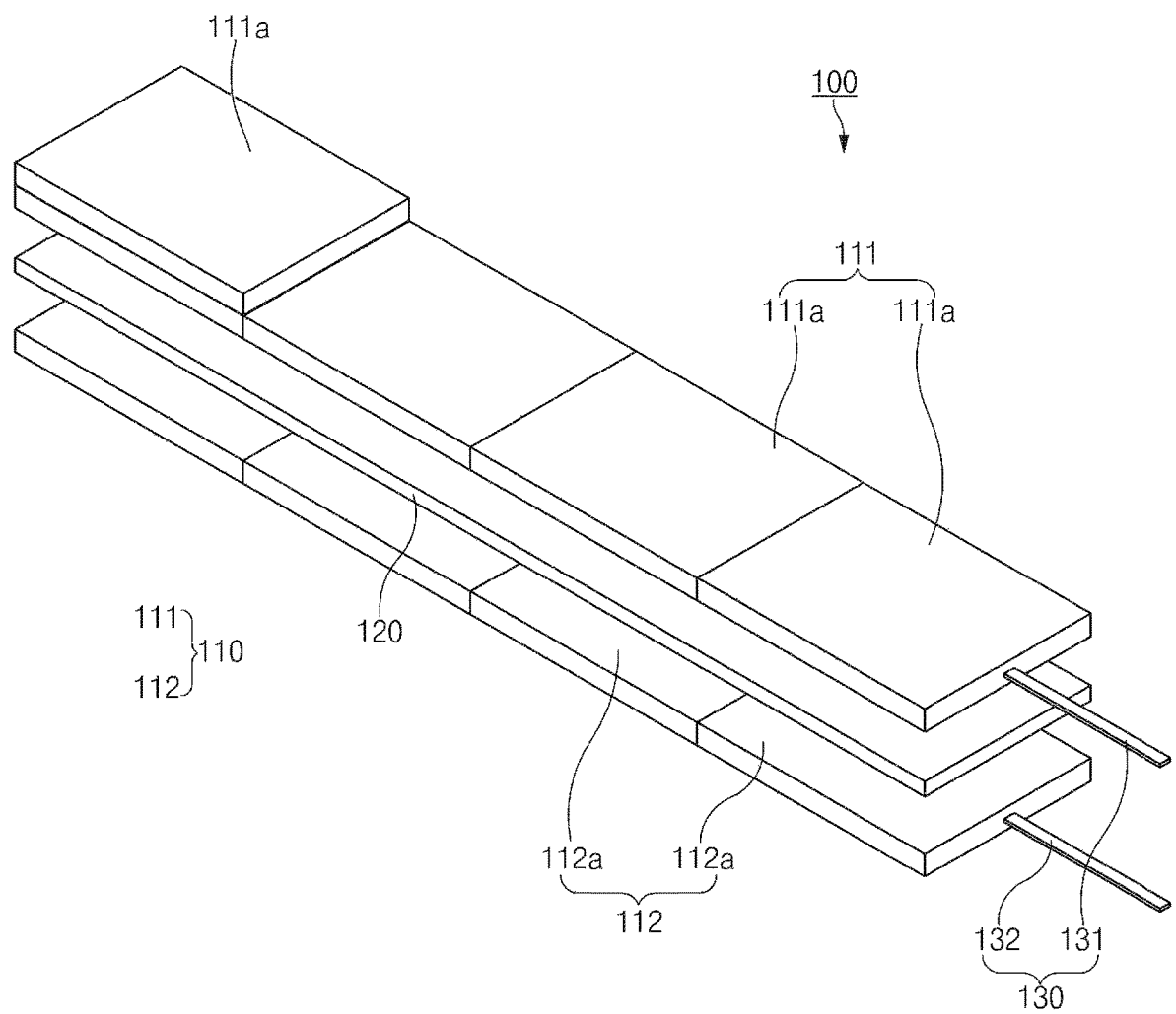
FIGS. 3 to 5 are perspective views illustrating various shapes of the electrode assembly according to an embodiment of the present invention.

As a first example, as illustrated in FIG. 3, the plurality of first electrodes 111a or the plurality of second electrodes 112a may be lengthily connected to each other side-by-side in one direction to realize a unit electrode 110 comprising the first unit electrode 111 and the second unit electrode 112, each of which has a predetermined length. Therefore, an electrode assembly 100 having a predetermined length and comprising the first unit electrode 111 and the second unit electrode 112, each of which has the predetermined length, may be realized.

As a second example, as illustrated in FIG. 1, the plurality of first electrodes 111a or the plurality of second electrodes 112a may be connected to each other in all area directions of the electrode to realize a unit electrode 110 comprising the first unit electrode 111 and the second unit electrode 112, each of which has a predetermined area. Therefore, an electrode assembly 100 having a predetermined area and comprising the first unit electrode 111, the second unit electrode 112, each of which has the predetermined area, and the separator 120 may be realized.

Figure 4:
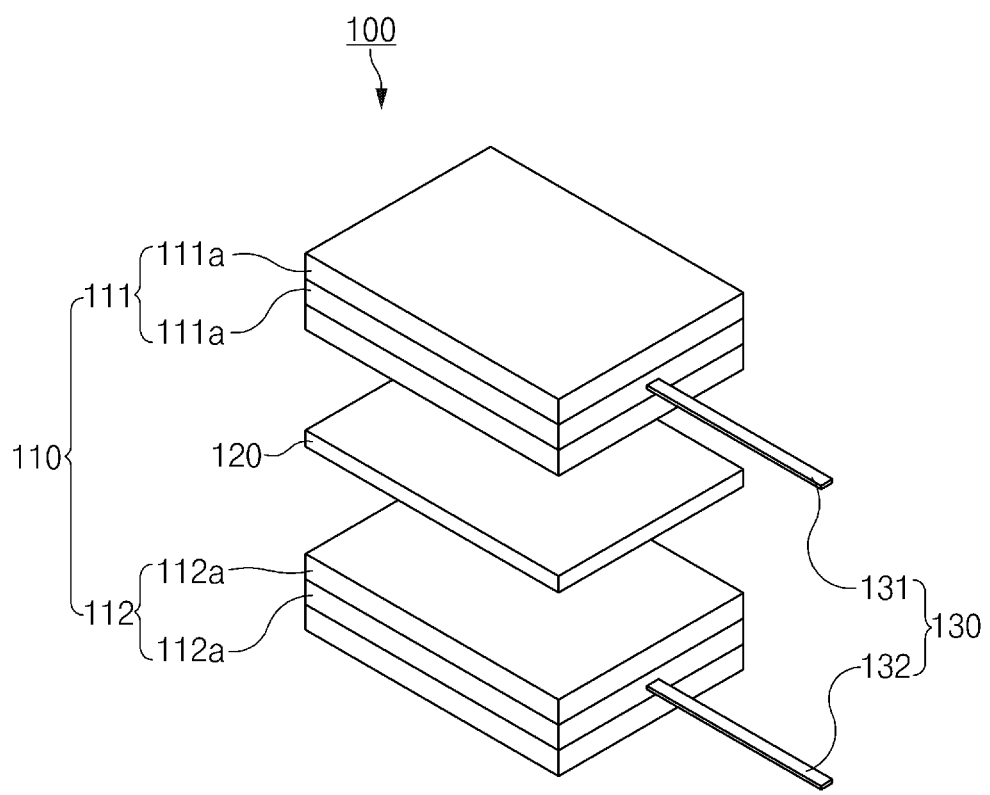

As a third example, as illustrated in FIG. 4, the plurality of first electrodes 111a or the plurality of second electrodes 112a may be connected to each other in a thickness direction of the electrode to realize a unit electrode 110 comprising the first unit electrode 111 and the second unit electrode 112, each of which has a predetermined thickness. Therefore, an electrode assembly 100 having a predetermined thickness and comprising the first unit electrode 111, the second unit electrode 112, each of which has the predetermined thickness, and the separator 120 may be realized.

As a fourth example, the plurality of first electrodes 111a or the plurality of second electrodes 112a may be connected to each other side-by-side in a plane and a thickness direction of the electrode to realize a unit electrode 110 comprising the first unit electrode 111 and the second unit electrode 112, each of which has a predetermined area and thickness. Therefore, an electrode assembly 100 having a predetermined area and thickness and comprising the first unit electrode 111, the second unit electrode 112, each of which has the predetermined area and thickness, and the separator 120 may be realized.

Figure 5:
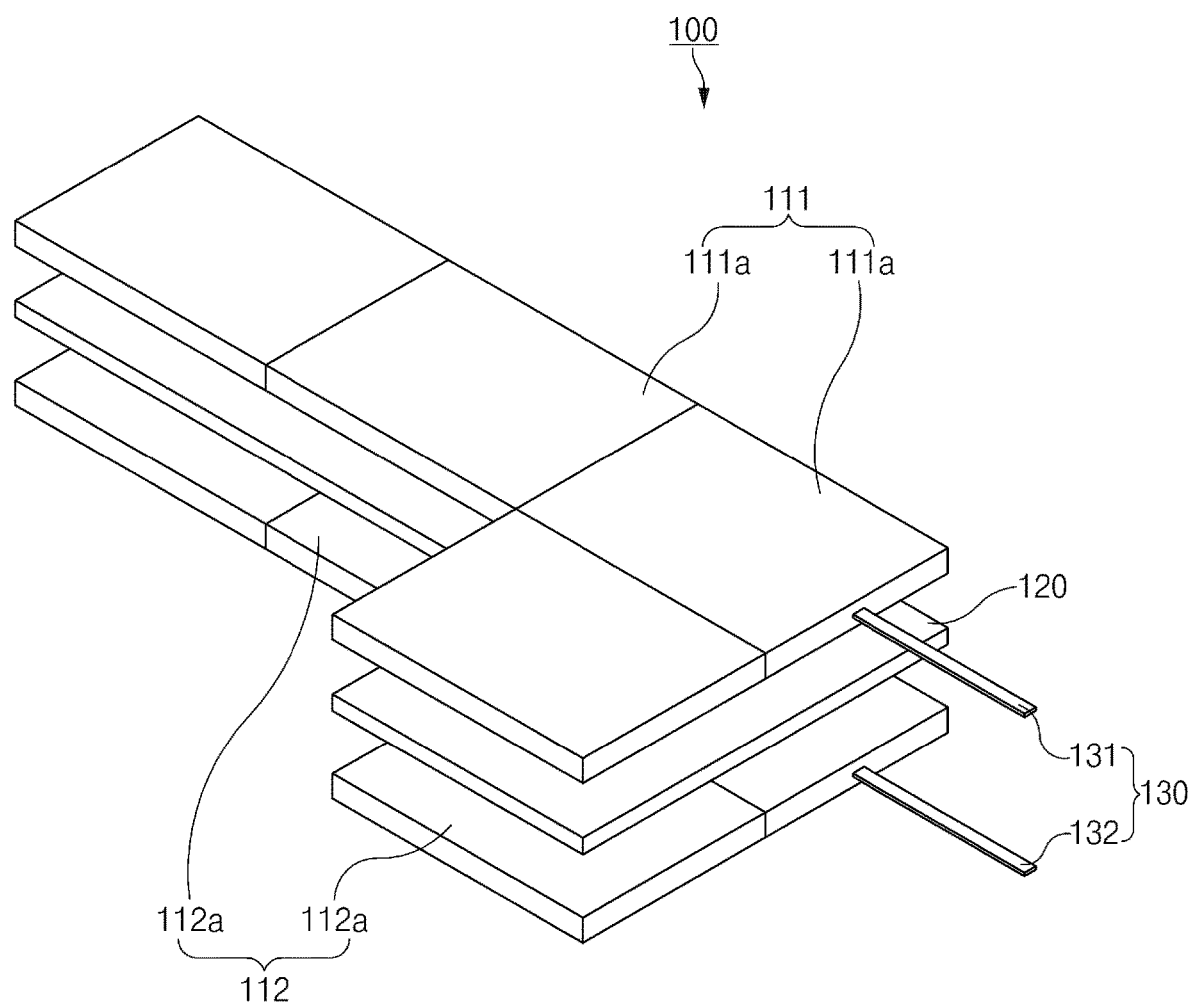

As a fifth example, as illustrated in FIG. 5, the plurality of first electrodes 111a or the plurality of second electrodes 112a may be irregularly connected to each other side-by-side to realize a unit electrode 110 comprising the first unit electrode 111 and the second unit electrode 112, each of which has a new shape. Therefore, an electrode assembly 100 having a new area and comprising the first unit electrode 111, the second unit electrode 112, each of which has the new shape, and a separator 120 may be realized. Particularly, the unit electrode 110 and the electrode assembly 100 may be newly designed to match the inner space of a battery case that is designed to be compact through the irregular connection of the electrodes as described above to significantly improve marketability.

As a sixth example, the plurality of first electrodes 111a or the plurality of second electrodes 112a may be connected to each other in directions different from each other to realize a unit electrode 110 comprising the first unit electrode 111 and the second unit electrode 112, which have shapes different from each other. Therefore, an electrode assembly 100 comprising the first unit electrode 111, the second unit electrode 112, which have the shapes different from each other, and the separator 120 may be newly designed.

That is, the number of first electrodes 111a and the connection direction of the first electrodes 111a may be different from the number of second electrodes 112a and the connection direction of the second electrodes 112a. Thus, an electrode assembly having a structure that gradually decreases in width from the lowermost end to the uppermost end thereof, an electrode assembly having a screw shape that gradually rotates in one direction from the lowermost end to the uppermost end thereof, or an electrode assembly having a hollow defined in a vertical direction may be realized.

The electrode may be made of a solid electrode mixture. The solid electrode mixture may be formed by mixing at least one or more of a solid conductive material and a solid binder with a solid electrode active material. Thus, the electrode has a polarity through the electrode active material, has conductivity through the conductive material, and has coupling and adhesion between the electrode active material and the conductive material through the binder.

For example, the first electrode 111a is formed by mixing the conductive material and the binder with a solid first electrode active material, and the second electrode 112a is formed by mixing the conductive material and the binder with a solid second electrode active material.

Thus, each of the plurality of electrodes may be made of the solid electrode mixture without the collector, and thus, all surfaces of the electrode may have adhesion. Therefore, the first unit electrode 111 and the second unit electrode 112, which are integrated with each other, may be realized.

Also, each of the plurality of electrodes may be made of the solid electrode mixture without the collector, and thus, all surfaces of the electrode may have conductivity. Therefore, the first unit electrode 111 and the second unit electrode 112, which have conductivity and are integrated with each other, may be realized.

The electrode assembly according to an embodiment of the present invention comprises an electrode tab 130 attached to the unit electrode 110, and the electrode tab 130 is attached to at least one or more of an entire surface or an edge surface of the unit electrode 110.

For example, the electrode tab 130 comprises a first electrode tab 131 attached to the first unit electrode 111 and a second electrode tab 132 attached to the second unit electrode 112. The first and second electrode tabs 131 and 132 may be attached to any one portion of the entire surface and the edge surface of the first and second unit electrodes 111 and 112. Therefore, the attached position of the electrode tab 120 may be adjusted to match the shape of the battery case to significantly improve a degree of freedom in design of the secondary battery.

Here, heat and a pressure may be applied to the first and second electrode tabs 131 and 132 to attach the first and second electrode tabs 131 and 132 to the first and second unit electrodes 111 and 112, thereby improving adhesion between the electrode tab and the unit electrode, which are attached to each other.

The electrode tab 130 may be provided as an electrode wire having flexibility and conductivity. Thus, the electrode tab 130 may be bent to match an inner space of a battery case (not shown) in which the electrode assembly 100 is accommodated and thus effectively accommodate the electrode assembly 100.

Figure 6:
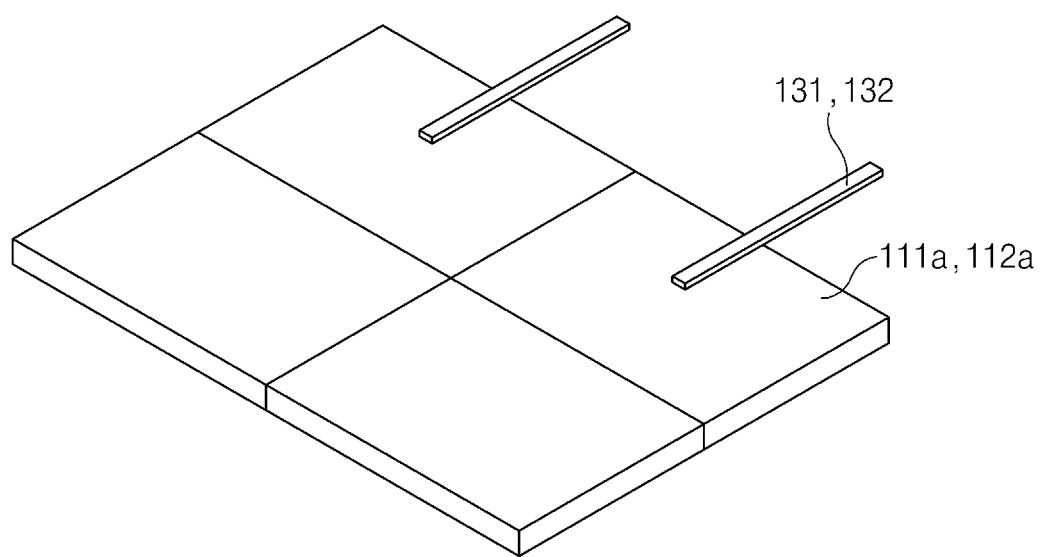
FIG. 6 is a perspective view illustrating another example of an electrode tab provided in the electrode assembly according to an embodiment of the present invention.

As illustrated in FIG. 6, the electrode tab 130 may be attached to a top surface of the unit electrode to effectively utilize a side space of the unit electrode, thereby realizing a more compact electrode assembly.

Thus, the electrode assembly 100 comprising the above-described constituents according to an embodiment of the present invention may realize the unit electrode having a novel structure by using the electrode made of the solid electrode mixture.

Hereinafter, a method of manufacturing a secondary battery according an embodiment of the present invention will be described in detail.

Figure 7:
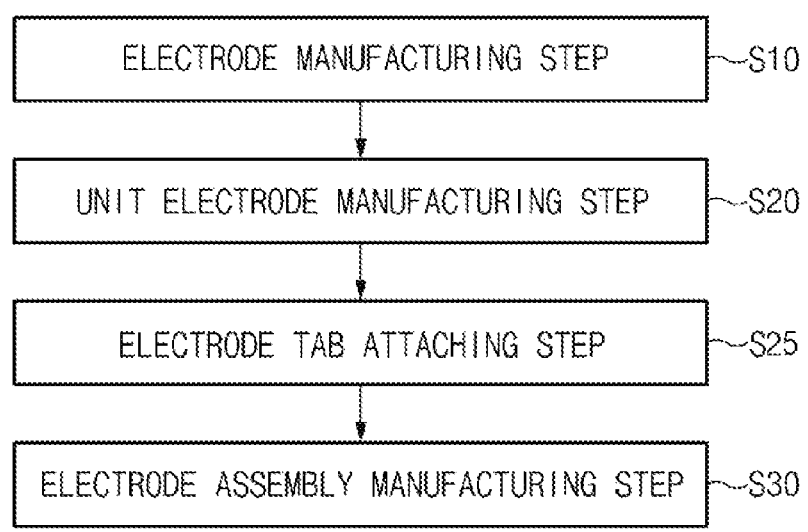
FIG. 7 is a flowchart illustrating a method for manufacturing an electrode assembly according to an embodiment of the present invention.

As illustrated in FIG. 7, a method for manufacturing an electrode assembly according to an embodiment of the present invention comprises an electrode manufacturing step (S10) of pressing a solid electrode mixture to manufacture a plurality of electrodes, a unit electrode manufacturing step (S20) of connecting the plurality of electrodes manufactured in the electrode manufacturing step (S10) to each other to manufacture a unit electrode, and an electrode assembly manufacturing step (S30) of alternately laminating the plurality of unit electrodes manufactured in the unit electrode manufacturing step (S20) and one or more separators to manufacture an electrode assembly.

The electrode manufacturing step (S10) comprises an electrode mixture manufacturing process and an electrode manufacturing process. In the electrode mixture manufacturing process, at least one or more of a solid conductive material and a solid binder are mixed with a solid electrode active material at a set ratio to manufacture the electrode mixture. For example, in the electrode mixture manufacturing process, a first electrode active material, the conductive material, and the binder are mixed with each other to manufacture a first electrode mixture, and a second electrode active material, the conductive material, and the binder are mixed with each other to manufacture a second electrode mixture.

In the electrode manufacturing process, the electrode mixture is inserted into a mold having the form of the electrode to strongly press the electrode mixture, thereby manufacturing an electrode. For example, the first electrode mixture is pressed to manufacture a plurality of first electrodes 111a, and the second electrode mixture is pressed to manufacture a plurality of second electrodes 112a. Here, each of the first electrodes 111a and the second electrodes 112a does not comprise a collector. Thus, each of the first electrode 111a and the second electrode 112a may have conductivity and adhesion on an entire surface thereof.

The electrode manufacturing step (S10) comprises a step of dry mixing the electrode active material, the conductive material, and the binder under a high stirring speed condition.

For example, in a positive electrode manufacturing step, a positive electrode active material, the conductive material, and the binder are mixed with each other under the high stirring speed condition. Here, although not particularly limited, the positive electrode active material uses a general positive electrode active material, e.g., an alkali metal, an alkaline earth metal, a Group 13 element, a Group 14 element, a Group 15 element, a transition metal, a rare earth element, or lithium-containing metal oxide comprising a combination of the elements. Also, chalcogenide-based compounds may be also applied. As a nonlimiting example, lithium transition metal oxide (for example, lithium manganese composite oxides such as $LiMn_2O_4$, lithium nickel oxides such as $LiNiO_2$, lithium cobalt oxides such as $LiCoO_2$, and materials obtained by substituting a portion of manganese, nickel, and cobalt of the oxides with other general transition metals or lithium-containing vanadium oxide)-based positive active materials such as $LiM_xO_y$, (where M=Co, Ni, Mn, or $Co_aNi_bMn_c$) or a chalcogenide (for example, manganese dioxide, titanium disulfide, molybdenum disulfide, etc.)-based positive compounds may be applied.

More particularly, the positive electrode active material may be a lithium transition metal oxide-based positive electrode active material. For example, the positive electrode active material may be selected from the group consisting of $LiCoO_2$, $LiNiO_2$, $LiMn_2O_4$, $Li_4Mn_5O_{12}$, $LiFePO_4$, $Li(Co_xNi_{1-x})O_2$ ($0.5 \leq x<1$), and $Li_aNi_bCo_cX_1dX_{2e}O_2$ (each of $X_1$ and $X_2$ independently represent at least one element selected from the group consisting of Mn, Al, Mg, Ti, Zr, Fe, V, W, Si, and Sn; where $0.8 \leq a \leq 1.3$, $0.1 \leq b<1.0$, $0.1 \leq c<1.0$, $0 \leq d<1$, $0 \leq e<1$).

Although not particularly limited, the conductive material may be general conductive materials, for example, natural graphite, artificial graphite, carbon black, acetylene black-based or Gulf Oil Company products, or a mixture of one or more kinds of the materials.

The binder may use general binders used in composites for forming a positive electrode, but is not particularly limited. For example, polytetrafluoroethylene (PTFE), polyvinylidene fluoride (PVdF) or a copolymer thereof, styrene butadiene rubber (SBR), cellulose, and the like may be used as the binder.

In the stirring speed condition, a stirrer may operate at a stirring speed of 500 rpm to 5,000 rpm, preferably, 2,000 rpm to 3,000 rpm.

The binder may have a content of 0.5 parts to 20 parts by weight, preferably 5 parts to 10 parts by weight based on 100 parts by weight of the total weight of the positive electrode active material and the conductive material.

In the unit electrode manufacturing step (S20), the plurality of electrodes are connected to each other to manufacture a unit electrode having a novel structure. For example, in the unit electrode manufacturing step (S20), the plurality of first or second electrodes 111a or 112a are connected to each other side-by-side to manufacture a first or second unit electrode 111 or 112 having a set area, the plurality of first or second electrodes 111a or 112a are connected to each other in a thickness direction of the electrode to manufacture a first or second unit electrodes 111 or 112 having a set thickness, or the plurality of first or second electrodes 111a or 112a are connected to each other in a thickness direction and side-by-side to manufacture a first or second unit electrode 111 or 112 having a set area and thickness.

Particularly, in the unit electrode manufacturing step (S20), when the plurality of electrodes are irregularly connected to each other, a unit electrode having a shape of "⊏", "¬", "☐", or "H" may be manufactured.

The unit electrode manufacturing step (S20) may further comprise a process of thermally fusing the electrode. In the process of thermally fusing the electrode, heat and a pressure may be applied to the unit electrode in which the plurality of electrodes are connected to each other to activate adhesion between the plurality of electrodes, thereby manufacturing an integrated unit electrode.

After the unit electrode manufacturing step (S20), an electrode tab attaching step (S25) of attaching an electrode tab 130 to the unit electrode 110 may be further performed.

In the electrode tab attaching step (S25), a first or second electrode tab 131 or 132 is attached to the first or second unit electrode 111 or 112. Here, at least one or more of the first or second electrode tab 131 or 132 may be attached to at least one or more of any one surface of a surface or an edge surface of the first or second unit electrode 111 or 112.

Particularly, the electrode tab attaching step (S25) may further comprise a process of thermally fusing the electrode tab to more firmly attach the electrode tab. In the process of thermally fusing the electrode tab, heat and a pressure may be applied to the electrode tab attached to the unit electrode to more firmly attach the electrode tab to the unit electrode.

The electrode tab 130 may be formed by using an electrode wire having flexibility and conductivity. Thus, although the electrode tab 130 attached to the unit electrode 110 is attached at an erroneous position, the position of the electrode tab 130 may be corrected through the flexibility of the electrode tab 130.

In the electrode assembly manufacturing step (S30), the plurality of unit electrodes 110, each of which has the novel structure, and one or more separators 120 are vertically laminated to manufacture the electrode assembly 100.

That is, the plurality of unit electrodes 110 comprise a first unit electrode 111 and a second unit electrode 112. A separator 120 may be disposed between the first unit electrode 111 and the second unit electrode 112 to manufacture the electrode assembly 100.

Thus, in the method for manufacturing the electrode assembly according to an embodiment of the present invention, the electrode assembly 100 comprising the unit electrode having the novel structure may be newly designed.

Figure 8:
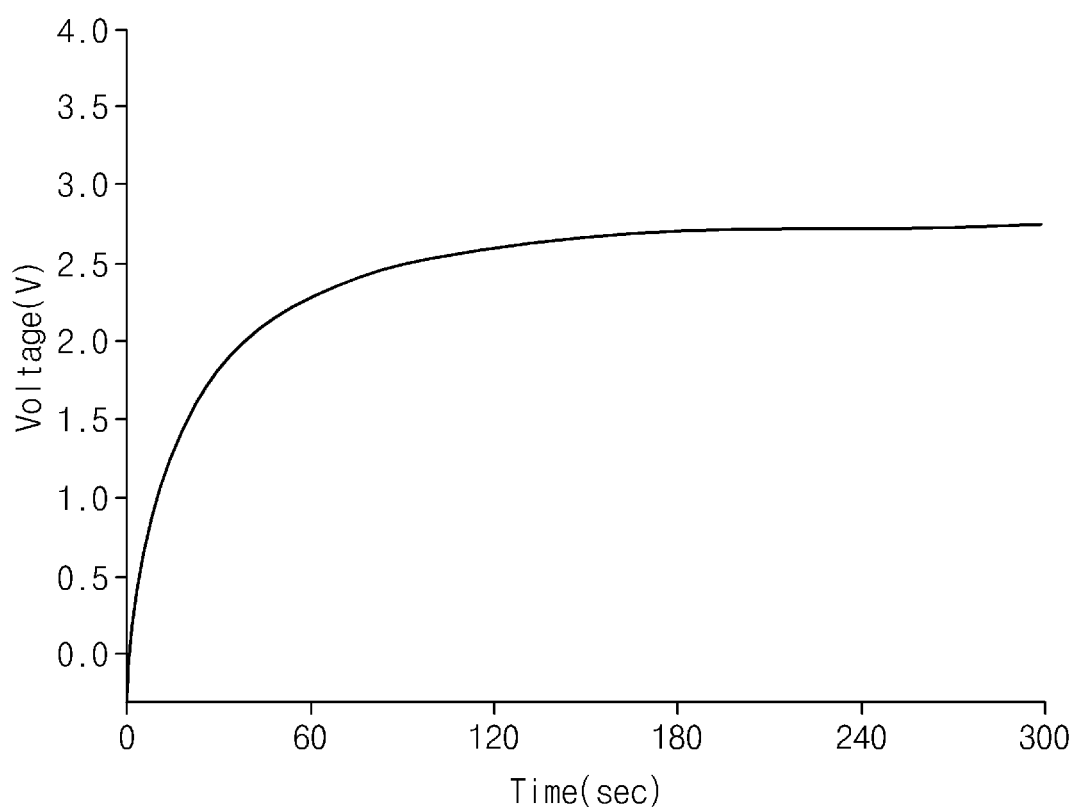
FIG. 8 is a graph illustrating a charged state of the electrode assembly according to an embodiment of the present invention.

A secondary battery comprising the electrode assembly according to an embodiment of the present invention may be manufactured through the above-described manufacturing method. Then, when the manufactured secondary battery is charged, it may be seen that the charging is stably performed as illustrated in FIG. 8.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrode assembly, in which a plurality of unit electrodes and a plurality of separators are alternately laminated,
   wherein each of the unit electrodes is provided by connecting a plurality of electrodes, each electrode being entirely made of a solid electrode mixture without a current collector, directly to each other,
   wherein the solid electrode mixture comprises a mixture of an electrode active material with at least one or more of a conductive material and a binder,
   wherein the electrode assembly further includes an electrode tab attached to an outer surface or an edge of the unit electrode, and
   wherein the electrode tab is provided as an electrode wire having flexibility and conductivity, is bent to match an inner space of a battery case, and is freely adjustable in position.

2. The electrode assembly of claim 1, wherein at least two electrodes of the plurality of electrodes are attached to each other side-by-side.

3. The electrode assembly of claim 1, wherein the plurality of electrodes provides an integrally formed unit electrode by adhesion of an outer surface of each electrode to an outer surface of an adjacent electrode.

4. The electrode assembly of claim 1, wherein an end of the electrode tab is attached to the unit electrode by applying heat and a pressure in a state of overlaying the unit electrode.

5. A method for manufacturing an electrode assembly, the method comprising:
- an electrode manufacturing step comprising pressing a solid electrode mixture to manufacture a plurality of electrodes;
- a unit electrode manufacturing step comprising connecting the plurality of electrodes manufactured in the electrode manufacturing step directly to each other to manufacture a unit electrode;
- an electrode tab attaching step comprising attaching an electrode tab to an outer surface or an edge of the unit electrode; and
- then, an electrode assembly manufacturing step comprising alternately laminating the plurality of unit electrodes manufactured in the unit electrode manufacturing step and one or more separators to manufacture an electrode assembly,
- wherein the solid electrode mixture is formed by mixing an electrode active material with at least one or more of a conductive material and a binder, and
- wherein the electrode tab is provided as an electrode wire having flexibility and conductivity, is bendable to match an inner space of a battery case, and is freely adjustable in position.

6. The method of claim 5, wherein, in the unit electrode manufacturing step, at least two electrodes of the plurality of electrodes are attached to each other side-by-side to manufacture the unit electrode.

7. The method of claim 5, wherein the unit electrode manufacturing step further comprises a process of applying heat and a pressure to the unit electrode in which the plurality of electrodes are attached to each other to increase adhesion of the plurality of electrodes.

8. The electrode assembly of claim 2, wherein at least a third electrode is stacked on one of the at least two electrodes.

9. The electrode assembly of claim 1, wherein at least two electrodes of the plurality of electrodes are attached to each other by stacking one of the at least two electrodes on another of the at least two electrodes.

10. The method of claim 6, wherein, in the unit electrode manufacturing step, at least a third electrode is stacked on one of the at least two electrodes.

11. The method of claim 5, wherein, in the unit electrode manufacturing step, at least two electrodes of the plurality of electrodes are attached to each other by stacking one of the at least two electrodes on another of the at least two electrodes.

* * * * *